US011415966B2

(12) United States Patent
Furusawa et al.

(10) Patent No.: US 11,415,966 B2
(45) Date of Patent: Aug. 16, 2022

(54) HART MODEM AND DIAGNOSTIC SYSTEM

(71) Applicant: Azbil Corporation, Tokyo (JP)

(72) Inventors: Naoki Furusawa, Tokyo (JP); Mamoru Kagoura, Tokyo (JP); Naoyuki Fukao, Tokyo (JP); Hiroyuki Tsugane, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 115 days.

(21) Appl. No.: 17/094,046

(22) Filed: Nov. 10, 2020

(65) Prior Publication Data

US 2021/0141365 A1  May 13, 2021

(30) Foreign Application Priority Data

Nov. 13, 2019 (JP) .............................. JP2019-205320

(51) Int. Cl.
*H04B 1/00* (2006.01)
*G05B 19/4155* (2006.01)
(Continued)

(52) U.S. Cl.
CPC ........... *G05B 19/4155* (2013.01); *H04B 3/46* (2013.01); *H04L 5/02* (2013.01); *H04L 27/0002* (2013.01);
(Continued)

(58) Field of Classification Search
CPC ...... G05B 19/4155; G05B 2219/31368; H04B 3/46; H04B 17/0085; H04L 5/02;
(Continued)

(56) References Cited

U.S. PATENT DOCUMENTS 5,970,430 A    10/1999  Burns et al.
2009/0089623 A1  4/2009  Neering et al.
(Continued)

FOREIGN PATENT DOCUMENTS

JP    2015-064766 A    4/2015

OTHER PUBLICATIONS

China National Intellectual Property Administration, "First Office Action," issued in Chinese Patent Application No. 202011244317.1, which is a counterpart to U.S. Appl. No. 17/094,046, dated Apr. 18, 2022, 20 pages (10 pages of English translation of Office Action and 10 pages of original Chinese Office Action).

*Primary Examiner* — Tanmay K Shah

(57) ABSTRACT

A HART modem includes: a HART/Host communication conversion unit, which relays communication between a HART device and a diagnostic device or a host device; a communication waveform detection unit configured to record data sampled from HART communication signals transmitted and received to and from the HART device in a communication waveform temporary storage unit; a communication content monitoring unit configured to monitor contents of HART communication and instruct the communication waveform detection unit to start recording and stop the recording of data according to a signal acquisition timing specified by a user; and a waveform acquisition management unit configured to transmit data accumulated in the communication waveform temporary storage unit to the diagnostic device when the recording of the data is stopped.

6 Claims, 8 Drawing Sheets

(51) Int. Cl.
    *H04B 3/46*      (2015.01)
    *H04L 27/00*     (2006.01)
    *H04L 43/045*    (2022.01)
    *H04L 5/02*      (2006.01)
(52) U.S. Cl.
    CPC .. *H04L 43/045* (2013.01); *G05B 2219/31368* (2013.01); *G06F 2201/835* (2013.01)
(58) Field of Classification Search
    CPC ... H04L 27/0002; H04L 43/045; H04L 43/18; G06F 2201/835; H04M 11/066
    USPC .......................................................... 375/147
    See application file for complete search history.

(56) References Cited

U.S. PATENT DOCUMENTS

| | | | |
|---|---|---|---|
| 2015/0087290 A1 | 3/2015 | Murate | |
| 2015/0338315 A1* | 11/2015 | Manahan | G08B 19/00 |
| | | | 702/183 |
| 2016/0182323 A1* | 6/2016 | Ferguson | H04L 43/045 |
| | | | 709/224 |
| 2017/0344445 A1* | 11/2017 | Vanderah | G05B 19/00 |
| 2019/0116477 A1* | 4/2019 | Bhagwani | H04W 16/18 |
| 2019/0278246 A1* | 9/2019 | Gopisetti | G06F 11/202 |

* cited by examiner

HART MODEM AND DIAGNOSTIC SYSTEM

CROSS-REFERENCE TO RELATED APPLICATION

The present application claims the benefit of and priority to Japanese Patent Application No. 2019-205320, filed on Nov. 13, 2019, the entire contents of which are incorporated by reference herein.

TECHNICAL FIELD

The present invention relates to a HART modem and a diagnostic system configured to confirm HART communication signals.

BACKGROUND

A Highway Addressable Remote Transducer (HART) communication is a communication method of superimposing a digital signal on a direct current signal (analog signal) of 4 to 20 mA used in control systems. The HART communication is used for the setting of a device by replacing field equipment (devices) of an existing control system with HART-enabled devices and then connecting a HART-enabled configurator (setting unit) to an analog signal line. The HART communication is also used for monitoring or control by transmitting and receiving measurement data of devices, and for determining the health of measurements or timing of replacement of devices in an equipment management system connected in parallel to the control system by transmitting and receiving self-diagnostic results of the devices (see Patent Literature 1).

The product lifetime of the control system is as long as at least 30 years, and thus the HART communication is advantageous for users in that data communication is enabled only by replacing the devices with the HART-enabled devices while using the existing control system as-is and adding (connecting in parallel) a configurator or an equipment management system (referred to collectively as HART host) to the control system.

However, depending on the state of wiring of the analog signal line, a load resistance required for the HART communication may be insufficient, or the analog signal line may be installed under a noise environment which may interfere with the HART communication, and thus the user desirable HART communication may be failed or become unstable.

When an error is encountered in writing or reading in the HART communication after the installation of the HART device and the HART host, a voltage is measured with a multimeter (tester), and the noise level, a digital communication waveform of a command issued from the HART host, and the digital communication waveform of response that the HART device issues for the command are inspected with an oscilloscope to inspect the cause. Also, various machines are used as needed to determine the cause of the communication error, such as confirming the contents of communication data with a protocol analyzer. However, the inspection by the oscilloscope has a problem of time-consuming because a point to be checked needs to be searched by scrolling in a screen after the acquisition of the digital communication waveform.

CITATION LIST

Patent Literature

PTL 1: JP-A-2015-64766

SUMMARY

To solve the above-described problem, it is an object of the present invention to provide a HART modem and a diagnostic system that allow for efficient confirmation of HART communication signal waveforms.

A HART modem of the present invention comprises: a communication conversion unit configured to relay communication between field equipment and a host device or a diagnostic device on a higher level; a storage unit configured to store data; a waveform detection unit configured to record data sampled from HART communication signals to be transmitted and received to and from the field equipment in the storage unit; a communication content monitoring unit configured to monitor contents of the HART communication through the communication conversion unit and instruct the waveform detection unit to start recording and stop recording of data according to a signal acquisition timing specified by a user; and a waveform acquisition management unit configured to transmit the data accumulated in the storage unit to the diagnostic device when the recording of the data stops.

A diagnostic system according to the present invention comprises: a HART modem; and a diagnostic device, wherein the diagnostic device comprises: an acquisition timing instruction unit configured to transmit an instruction signal for instructing an acquisition timing to the HART modem upon reception of the acquisition timing of a HART communication signal specified by a user; a waveform generation unit configured to generate an image for displaying a signal waveform indicated by data upon reception of the data transmitted from a waveform acquisition management unit of the HART modem; and a display unit configured to display the image generated by the waveform generation unit.

A configuration example of the HART modem of the present invention further comprises a clock unit configured to count time and is characterized in that the waveform detection unit records data sampled from the HART communication signals, and a timestamp indicating time information acquired by the clock unit in the storage unit according to the instruction from the communication content monitoring unit, and the waveform acquisition management unit transmits the data accumulated in the storage unit and the timestamp attached to the data to the diagnostic device when the recording of the data and the timestamp stops.

The diagnostic system of the present invention comprises the HART modem and the diagnostic device and is characterized in that the diagnostic device comprises: an acquisition timing instruction unit configured to transmit an instruction signal for instructing an acquisition timing to the HART modem upon reception of the acquisition timing of a HART communication signal specified by a user; a waveform generation unit configured to generate an image for displaying a signal waveform indicated by data and a time stamp attached to the data upon reception of the data and the timestamp transmitted by the waveform acquisition management unit of the HART modem; and a display unit configured to display the image generated by the waveform generation unit.

In a configuration example of the diagnostic system of the present invention, the acquisition timing specified by the user is any one of a timing in which a start of transmitting a HART communication command is a start event and an end of reception of response to the command is an end event, a timing in which the start of reception of the response is the start event and the end of transmission of a next command is the end event, and a timing in which the end of reception of the response is the start event and a time point after an elapse of a certain period from the start event is the end event.

According to the present invention, the user can view a waveform at a point where the user wants to check by specifying the acquisition timing of the HART communication signal waveform, and confirmation of the waveform can be performed efficiently.

DESCRIPTION OF EMBODIMENTS

First Exemplary Embodiment

Figure 1:
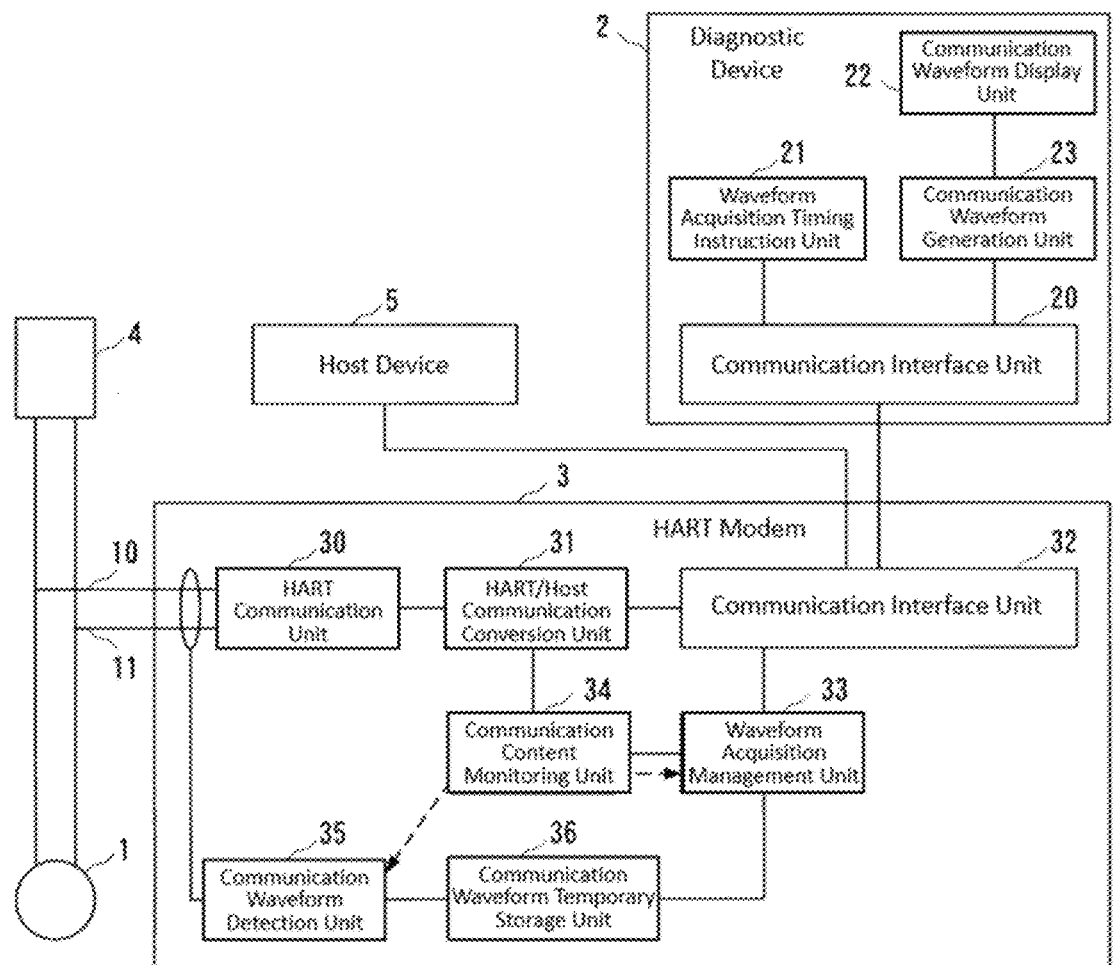
FIG. 1 is a block diagram illustrating a configuration of a diagnostic system according to a first exemplary embodiment of the present invention.

Referring now to the drawings, examples of the present invention will be described below. FIG. 1 is a block diagram illustrating a configuration of a diagnostic system according to a first exemplary embodiment of the present invention. The diagnostic system comprises, for example, a HART device 1, which is field equipment such as a pressure transmitter and a positioner, a diagnostic device 2, and a HART modem 3, which is a communication device configured to relay communication between the HART device 1 and the diagnostic device 2 or a host device 5.

The diagnostic device 2 comprises: a communication interface unit 20 configured to control communication with the HART modem 3; a waveform acquisition timing instruction unit 21 configured to transmit an instruction signal for instructing an acquisition timing to the HART modem 3 upon reception of the acquisition timing of HART communication signal specified by a user; a communication waveform display unit 22 configured to display an image; and a communication waveform generation unit 23 configured to generate an image for displaying a signal waveform indicated by received data transmitted from the HART modem 3 upon reception of the data.

The HART modem 3 comprises: a HART communication unit 30 configured to control communication with the HART device 1; a HART/Host communication conversion unit 31 configured to execute a conversion process between a frequency signal (HART signal) and a digital signal; a communication interface unit 32 configured to control communication with the diagnostic device 2 or the host device 5; a waveform acquisition management unit 33 configured to transmit data accumulated in a communication waveform temporary storage unit, described later, to the diagnostic device 2; a communication content monitoring unit 34 configured to monitor contents of the HART communication and instruct the communication waveform detection unit, described later, to start recording and stop recording of data according to the signal acquisition timing specified by the user; a communication waveform detection unit 35 configured to record data sampled from frequency signals transmitted and received to and from the HART device 1 in the communication waveform temporary storage unit, described later; and a communication waveform temporary storage unit 36.

Reference numeral 4 in FIG. 1 designates a power source or an I/O module configured to supply a power supply voltage to the HART device 1 via analog signal lines 10 and 11.

Figure 2:
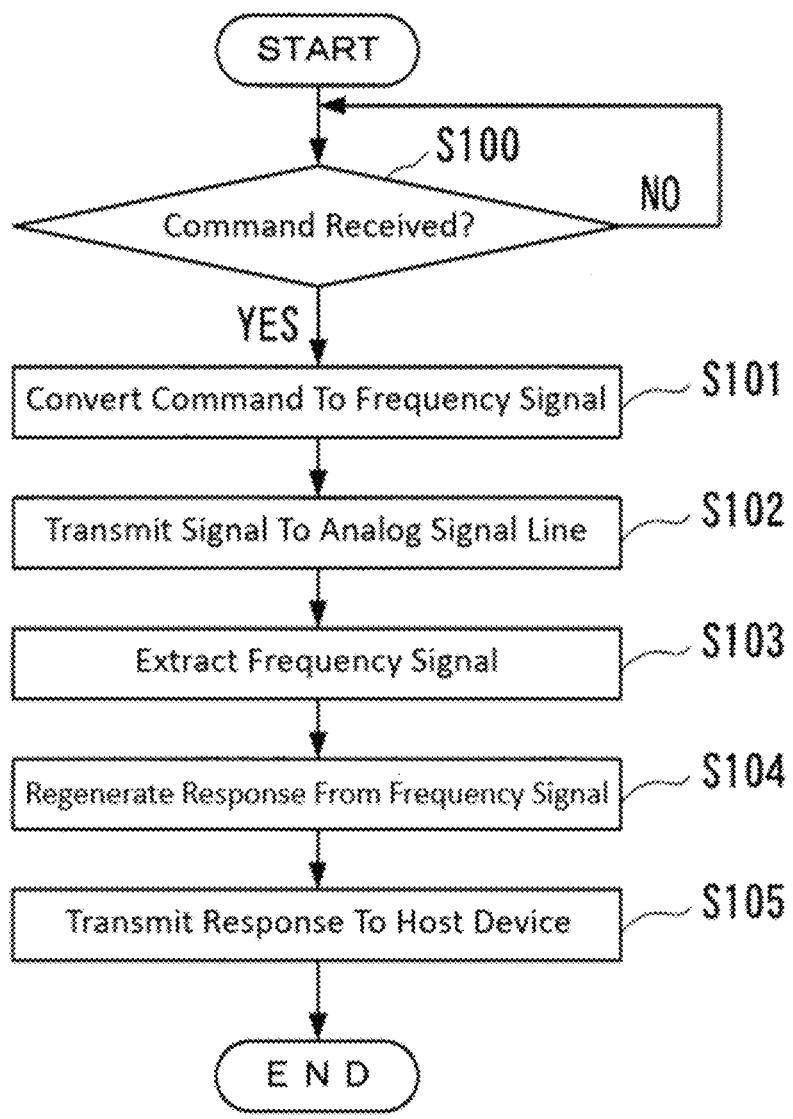
FIG. 2 is an explanatory flowchart describing a typical communication function of a HART modem according to the first exemplary embodiment of the present invention.

FIG. 2 is an explanatory flowchart describing a typical communication function of the HART modem 3. The communication interface unit 32 of the HART modem 3 receives the digital signals (commands) transmitted from the host device 5 including an equipment management system (Step S100 in FIG. 2).

The HART/Host communication conversion unit 31 of the HART modem 3 converts a command received by the communication interface unit 32 into a frequency signal (Step S101 in FIG. 2).

The HART communication unit 30 of the HART modem 3 superimposes the frequency signal obtained by the HART/Host communication conversion unit 31 on a 4 to 20 mA current signal and sends it to the analog signal lines 10 and 11 (Step S102 in FIG. 2).

In this manner, the command can be sent to the HART device 1.

Next, the HART communication unit 30 extracts the frequency signal superimposed on the 4 to 20 mA current signal sent from the HART device 1 (Step S103 in FIG. 2).

The HART/Host communication conversion unit 31 regenerates a digital signal (response) from the frequency signal extracted by the HART communication unit 30 (Step S104 in FIG. 2).

The communication interface unit 32 transmits the response obtained by the HART/Host communication conversion unit 31 to the host device 5 (Step S105 in FIG. 2).

In this manner, the response returned by the HART device 1 to the command can be transmitted to the host device 5.

Note that, in FIG. 2, the operation of the HART modem 3 relaying communication between the host device 5 and the HART device 1 is described, but in the present exemplary embodiment, the communication content monitoring unit 34 can also generate commands for diagnosis, as described below. To transmit a command for diagnosis to the HART device 1, the process of steps S101 to S104 is performed.

The communication interface unit 32 may communicate with the diagnostic device 2 or the host device 5 in wired or wireless communication.

The operation described in FIG. 2 is a general operation of the HART modem 3. Next, the characteristic operation of the present exemplary embodiment will be described.

Figure 3:
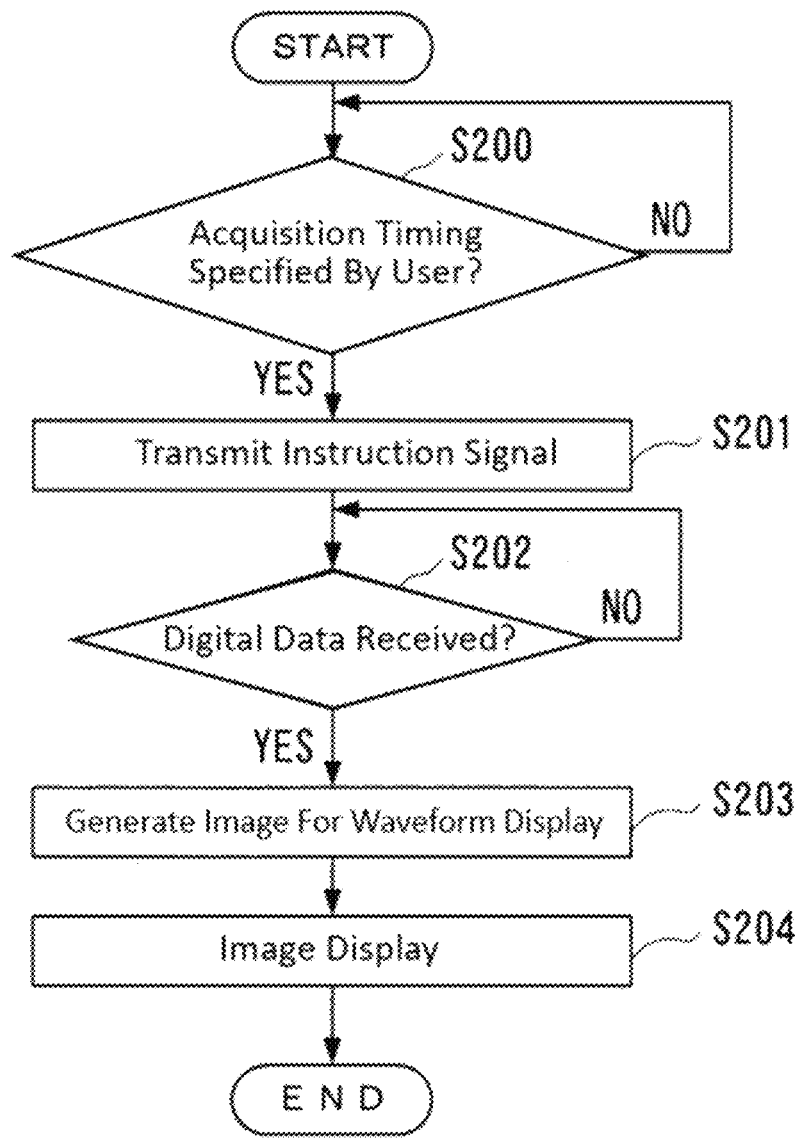
FIG. 3 is an explanatory flowchart describing a signal waveform display function of a diagnostic device according to the first exemplary embodiment of the present invention.
Figure 4:
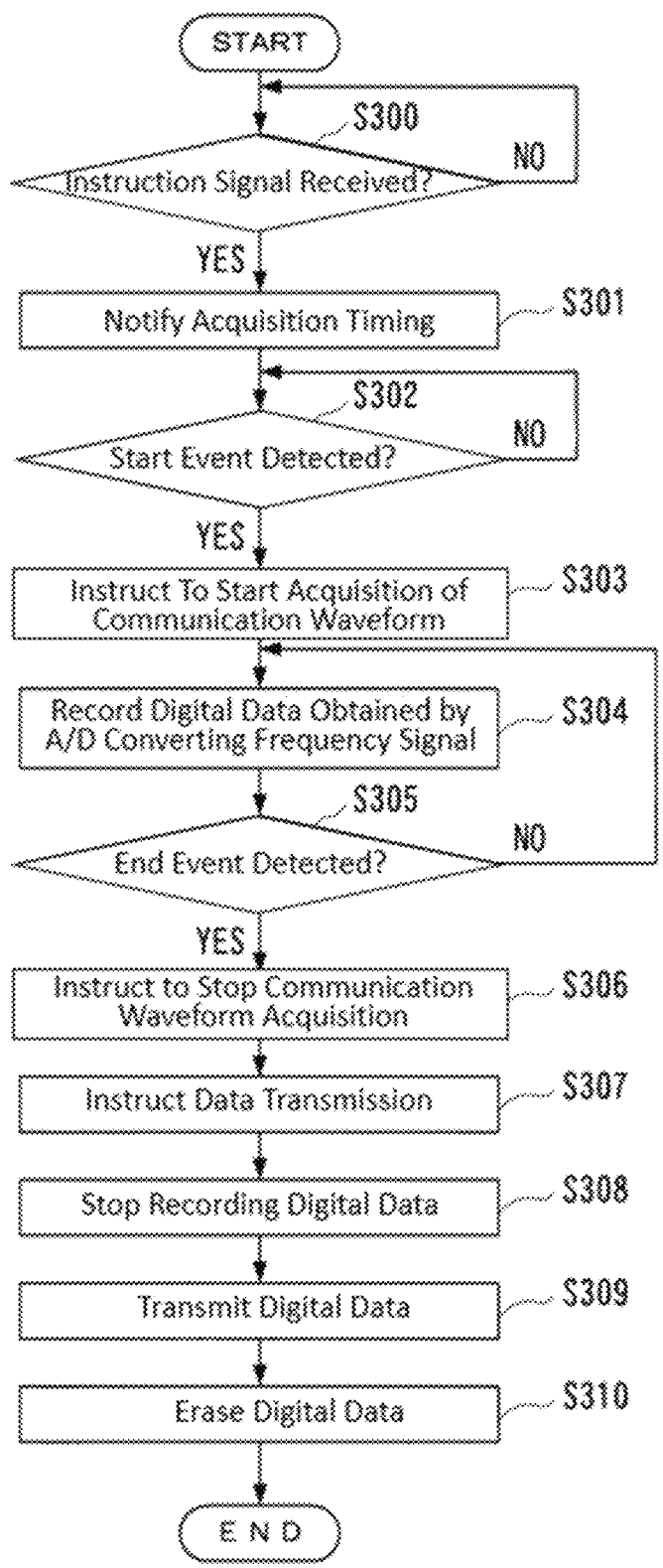
FIG. 4 is an explanatory flowchart describing a signal waveform display function of the HART modem according to the first exemplary embodiment of the present invention.

FIG. 3 is a flowchart describing a signal waveform display function of the diagnostic device 2, and FIG. 4 is a flowchart describing a signal waveform display function of the HART modem 3.

When an acquisition timing in the HART communication signal waveform is specified by a user (YES in Step S200 in FIG. 3), the waveform acquisition timing instruction unit 21 of the diagnostic device 2 passes an instruction signal instructing the HART modem 3 on the signal waveform acquisition timing to the communication interface unit 20. This instruction signal is transmitted from the communication interface unit 20 to the HART modem 3 (Step S201 in FIG. 3). A specific example of the acquisition timing will be described below.

Upon reception of the instruction signal from the diagnostic device 2 via the communication interface unit 32 (YES in Step S300 in FIG. 4), the waveform acquisition management unit 33 of the HART modem 3 notifies acquisition timing information indicated by the received instruction signal to the communication content monitoring unit 34 (Step S301 in FIG. 4).

The communication content monitoring unit 34 monitors the contents of the HART communication (communication protocol) through the HART/Host communication conversion unit 31. Upon detection of a start event specified by the acquisition timing information notified from the waveform acquisition management unit 33 (Yes in Step S302 in FIG. 4), the communication content monitoring unit 34 instructs the communication waveform detection unit 35 to start the acquisition of the communication waveform (Step S303 in FIG. 4).

Upon reception of the instruction to start the acquisition of the communication waveform from the communication content monitoring unit 34, the communication waveform detection unit 35 extracts a frequency signal superimposed on the 4 to 20 mA current signals on the analog signal lines 10 and 11 and records digital data obtained by performing A/D conversion on the frequency signal at a fixed sampling frequency in the communication waveform temporary storage unit 36 (Step S304 in FIG. 4).

In this manner, the waveform of the frequency signal is recorded in the communication waveform temporary storage unit 36. The recording of the waveform continues until an end event is detected.

Next, upon detection of the end event specified by the acquisition timing information notified from the waveform acquisition management unit 33 (YES in Step S305 in FIG. 4), the communication content monitoring unit 34 instructs the communication waveform detection unit 35 to stop the acquisition of the communication waveform (Step S306 in FIG. 4), and then the waveform acquisition management unit 33 to transmit data (Step S307 in FIG. 4).

Upon reception of the instruction to stop the acquisition of the communication waveform from the communication content monitoring unit 34, the communication waveform detection unit 35 stops recording of the digital data which is the A/D converted frequency signal (Step S308 in FIG. 4).

On the other hand, upon reception of the instruction to transmit data from the communication content monitoring unit 34, the waveform acquisition management unit 33 passes the digital data accumulated in the communication waveform temporary storage unit 36 to the communication interface unit 32. The communication interface unit 32 transmits the digital data received from the waveform acquisition management unit 33 to the diagnostic device 2 (Step S309 in FIG. 4). After the transmission is completed, the waveform acquisition management unit 33 erases the digital data accumulated in the communication waveform temporary storage unit 36 (Step S310 in FIG. 4).

Upon reception of the digital data from the HART modem 3 via the communication interface unit 20 (YES in Step S202 in FIG. 3), the communication waveform generation unit 23 of the diagnostic device 2 generates an image for displaying the signal waveform indicated by the received digital data (Step S203 in FIG. 3).

The communication waveform display unit 22 of the diagnostic device 2 displays the image generated by the communication waveform generation unit 23 (Step S204 in FIG. 3). In this manner, the HART communication signal waveform can be displayed on the diagnostic device 2.

Next, the three types of signal waveform acquisition timings that can be specified by the user of the diagnostic device 2 will be described. In the present exemplary embodiment, it is assumed that a computer or smartphone is used as the diagnostic device 2, and the user can specify the acquisition timing as follows to efficiently display the signal waveforms even on a small screen.

(1) In a first option of the acquisition timing, a timing of a start of transmitting a HART command (communication start) is a start event and an end of reception of response to the command is an end event. By specifying such an acquisition timing, the relationship between the command and the response can be confirmed efficiently in a way that cuts out parts before and after the communication.

(2) In a second option of the acquisition timing, the start of reception of the response is the start event and the end of transmission of the next command is the end event. By specifying such an acquisition timing, whether the communication timing between the end of the response and the start of the next command is correct or not may be confirmed efficiently.

(3) In a third option of the acquisition timing, the end of the reception (the end of communication) of the response is the start event and a time point after an elapse of a certain period from the start event is the end event. By specifying such an acquisition timing, the waveform of the noise superimposed on the 4 to 20 mA current signal when the HART communication is not performed can be confirmed efficiently.

In this manner, according to the present exemplary embodiment, the user can view a waveform at a point where the user wants to check by specifying the acquisition timing of the HART communication signal waveform, and confirmation of the waveform can be performed efficiently.

Second Exemplary Embodiment

Figure 5:
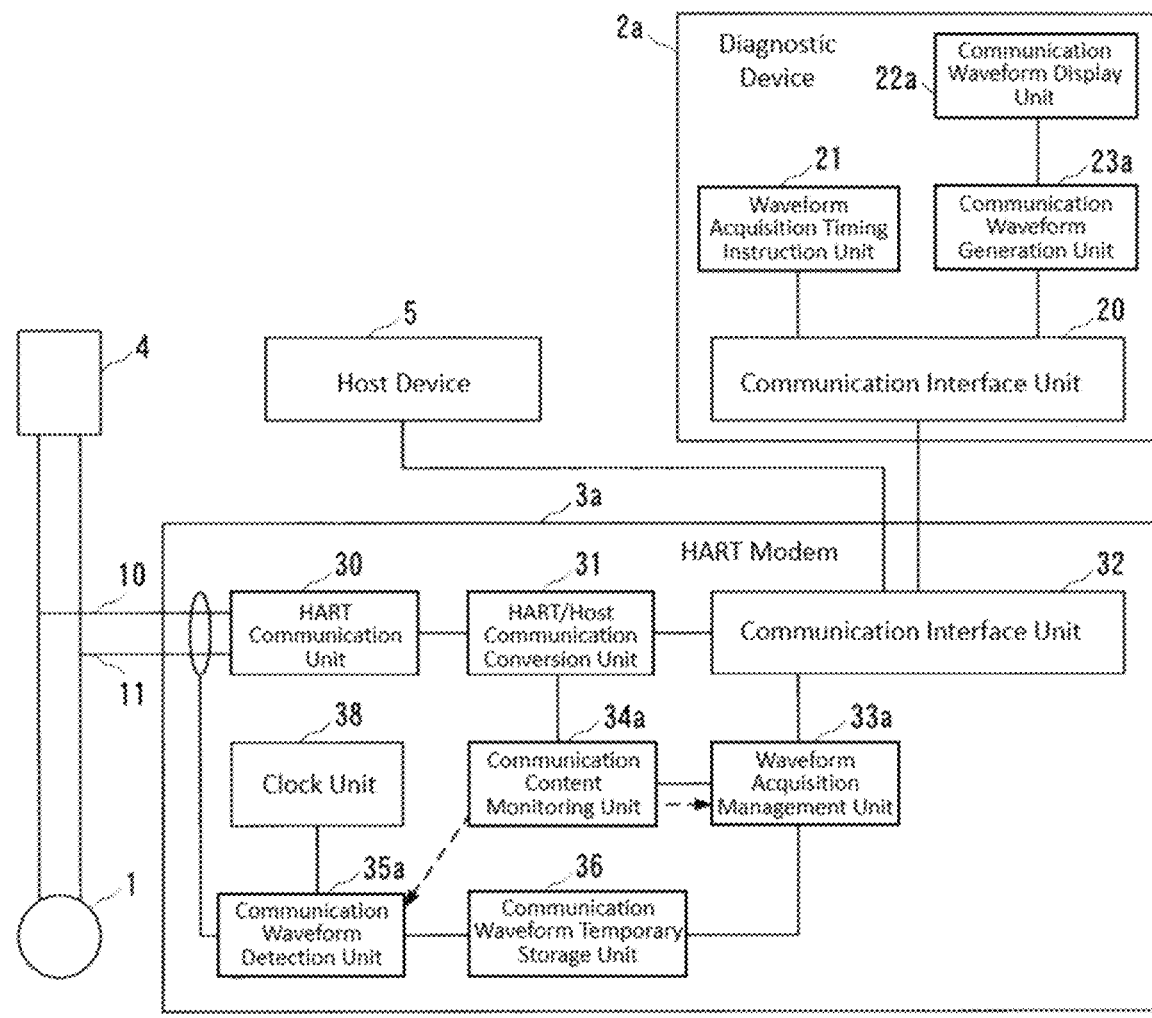
FIG. 5 is a block diagram illustrating a configuration of a diagnostic system according to a second exemplary embodiment of the present invention.

Next, a second exemplary embodiment of the present invention will be described. FIG. 5 is a block diagram illustrating a configuration of a diagnostic system according to the second exemplary embodiment of the present invention, and the same reference numerals designate the same components as in FIG. 1. A diagnostic device 2*a* of the present exemplary embodiment is provided with a communication interface unit 20, a waveform acquisition timing instruction unit 21, a communication waveform display unit 22*a*, and a communication waveform generation unit 23*a*.

A HART modem 3a in the present exemplary embodiment is provided with a HART communication unit 30, a HART/Host communication conversion unit 31, a communication interface unit 32, a waveform acquisition management unit 33a, a communication content monitoring unit 34a, a communication waveform detection unit 35a, a communication waveform temporary storage unit 36, and a clock unit 38 that counts time.

Figure 6:
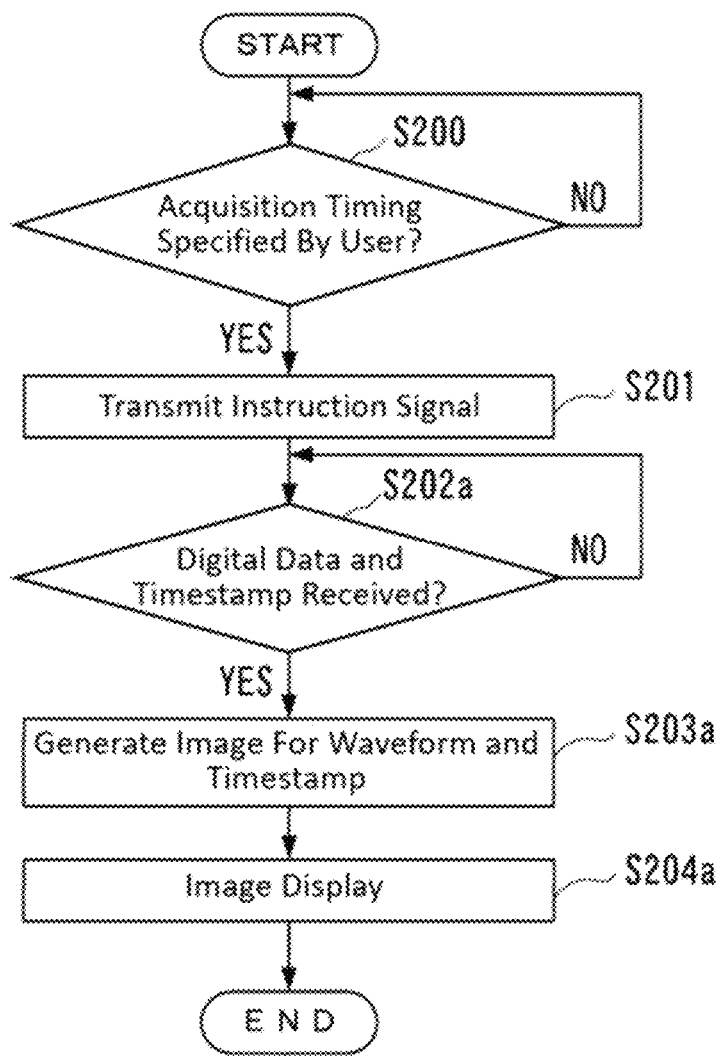
FIG. 6 is an explanatory flowchart describing a signal waveform display function of a diagnostic device according to the second exemplary embodiment of the present invention.
Figure 7:
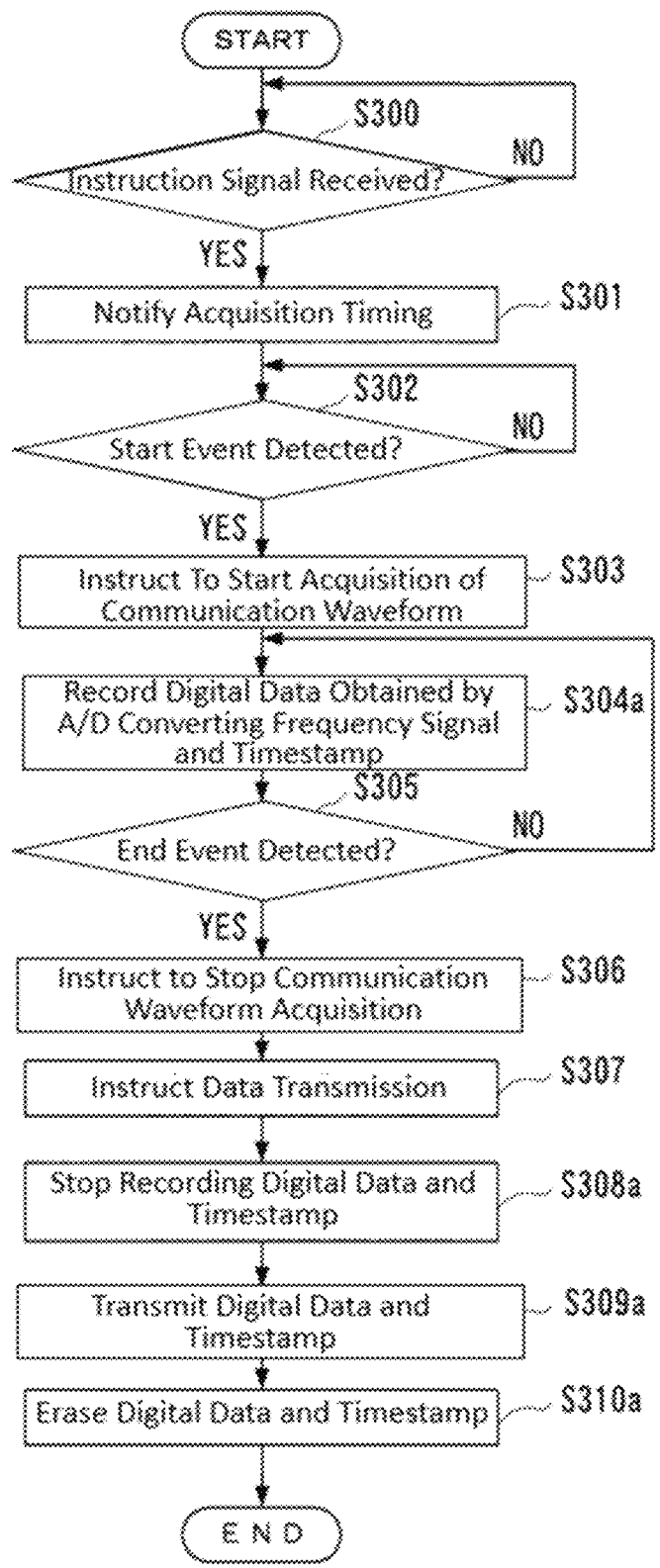
FIG. 7 is an explanatory flowchart describing a signal waveform display function of a HART modem according to the second exemplary embodiment of the present invention.

FIG. 6 is a flowchart describing a signal waveform display function of the diagnostic device 2a, and FIG. 7 is a flowchart describing a signal waveform display function of the HART modem 3a.

Processing in Steps S200 and S201 of the diagnostic device 2a and processing in Steps S300 to S303 of the HART modem 3a are the same in the second exemplary embodiment.

Upon reception of an instruction to start the acquisition of a communication waveform from the communication content monitoring unit 34a, the communication waveform detection unit 35a of the HART modem 3a records digital data obtained by performing A/D conversion on a frequency signal superimposed on the 4 to 20 mA current signal on analog signal lines 10 and 11 at a fixed sampling frequency and a timestamp indicating time information acquired from the clock unit 38 in the communication waveform temporary storage unit 36 (Step S304a in FIG. 7).

In this manner, the waveform of the frequency signal and the timestamp indicating the time of the waveform are recorded in the communication waveform temporary storage unit 36. The recording of the waveform and the timestamp continues until the end event is detected.

Upon detection of the end event specified by the acquisition timing information notified from the waveform acquisition management unit 33a (YES in Step S305 in FIG. 7), the communication content monitoring unit 34a of the HART modem 3a instructs the communication waveform detection unit 35a to stop the acquisition of the communication waveform (Step S306 in FIG. 7), and then the waveform acquisition management unit 33a to transmit data (Step S307 in FIG. 7).

Upon reception of the instruction to stop the acquisition of the communication waveform from the communication content monitoring unit 34a, the communication waveform detection unit 35a stops recording of the digital data which is the A/D converted frequency signal and the timestamp (Step S308a in FIG. 7).

Upon reception of the instruction to transmit data from the communication content monitoring unit 34a, the waveform acquisition management unit 33a passes the digital data and the timestamp accumulated in the communication waveform temporary storage unit 36 to the communication interface unit 32. The communication interface unit 32 transmits the digital data and the timestamp received from the waveform acquisition management unit 33a to the diagnostic device 2a (Step S309a in FIG. 7). After the transmission is completed, the waveform acquisition management unit 33a erases the digital data, and the timestamp accumulated in the communication waveform temporary storage unit 36 (Step S310a in FIG. 7).

Upon reception of the digital data and the timestamp from the HART modem 3a via the communication interface unit 20 (YES in Step S202a in FIG. 6), the communication waveform generation unit 23a of the diagnostic device 2a generates an image for displaying the signal waveform indicated by the received digital data and the timestamp attached to the digital data (Step S203a in FIG. 6).

The communication waveform display unit 22a of the diagnostic device 2a displays the image generated by the communication waveform generation unit 23a (Step S204a in FIG. 6).

In this manner, in the present exemplary embodiment, the signal waveform and the time of the waveform of the HART communication can be displayed on the diagnostic device 2a.

Note that, in FIG. 2, the operation of the HART modem 3 relaying communication between the host device 5 and the HART device 1 is described, but the communication content monitoring unit 34, 34a of the first and second exemplary embodiments can also generate commands for diagnosis. For example, upon reception of the acquisition timing information from the waveform acquisition management unit 33, 33a, the communication content monitoring unit 34, 34a may be configured to generate a command for diagnosis and pass it to the HART/Host communication conversion unit 31. Such a diagnostic command is transmitted to the HART device 1 as well as the command from the host device 5.

In the first and second exemplary embodiments, the acquisition of the signal waveforms described in (1) to (3) in the first exemplary embodiment may be limited to only one of a primary communication and a secondary communication specified by the user.

In the first and second exemplary embodiments, the acquisition of the signal waveforms described in (1) to (3) in the first exemplary embodiment may be limited to only the communication of commands specified by the user. In the case of (2), the start time of reception of the response to the user-specified command may be determined to be the start event. In the case of (3), the end time of reception of the response to the user-specified command may be determined to be the start event.

In the first and second exemplary embodiments, the communication waveform detection unit 35, 35a may be configured to be able to record communication protocol data (contents of the communication) obtained by the HART/Host communication conversion unit 31 in addition to the signal waveform and the timestamp in the communication waveform temporary storage unit 36. This makes it possible to visualize and display the contents of the HART communication as well as the signal waveform and the timestamp.

Of the configurations of the HART modem 3, 3a described in the first and second exemplary embodiments, a software function of the HART communication unit 30, the software functions of the HART/Host communication conversion unit 31 and the communication interface unit 32, and the software functions of the waveform acquisition management unit 33, 33a, the communication content monitoring unit 34, 34a, and the communication waveform detection unit 35, 35a, the communication waveform temporary storage unit 36 and the clock unit 38 may be implemented by a computer provided with a central processing unit (CPU), a storage device and an interface, and a program to control these hardware resources.

Figure 8:
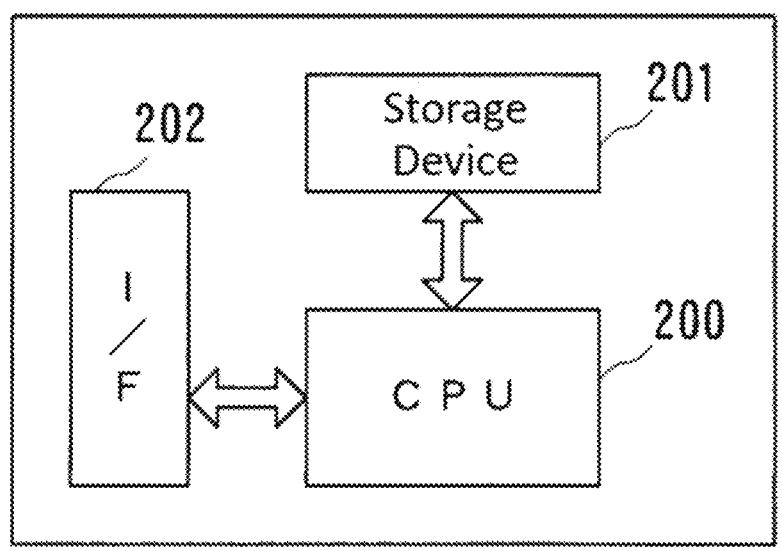
FIG. 8 is a block diagram illustrating a configuration example of computer implementing HART modems according to the exemplary embodiments of the present invention.

An example of the configuration of this computer is shown in FIG. 8.

The computer is provided with a CPU 200, a storage device 201, and an interface device (hereinafter referred to as the I/F) 202. The hardware of the HART communication unit 30, the hardware of the communication interface unit 32 and the like are connected to the I/F 202. In the computer with such a configuration, a program for achieving the diagnostic method of the present invention is stored in the storage device 201. The CPU 200 executes the processing described in the first and second exemplary embodiments according to the program stored in the storage device 201.

Similarly, the software functions of the communication interface unit 20, the waveform acquisition timing instruction unit 21, the communication waveform display unit 22, 22a, and the communication waveform generation unit 23, 23a in the configuration of the diagnostic device 2, 2a may be implemented by a computer. The hardware of the communication interface unit 20, the display, etc., are connected to the I/F 202 of the computer. The CPU 200 of the diagnostic device 2, 2a executes the processing described in the first and second exemplary embodiments according to the program stored in the storage device 201.

INDUSTRIAL APPLICABILITY

In addition to HART communication, the present invention can be applied to similar digital communication, such as vendor-specific communication protocols, for example, where digital signals are superimposed on analog signal lines.

REFERENCE SIGNS LIST

1 . . . HART device, 2, 2a . . . diagnostic device, 3, 3a . . . HART modem, 5 . . . host device, 10, 11 . . . analog signal line, 20, 32 . . . communication interface unit, 21 . . . waveform acquisition timing instruction unit, 22, 22a . . . communication waveform display unit, 23, 23a . . . communication waveform generation unit, 30 . . . HART communication unit, 31 . . . HART/HOST communication conversion unit, 33, 33a . . . waveform acquisition management unit, 34, 34a . . . communication content monitoring unit, 35, 35a . . . communication waveform detection unit, 36 . . . communication waveform temporary storage unit, 38 . . . clock unit.

The invention claimed is:

1. A Highway Addressable Remote Transducer (HART) modem comprising:
   a communication conversion unit configured to relay communication between field equipment and a host device or a diagnostic device on a higher level;
   a storage unit configured to store data;
   a waveform detection unit configured to record data sampled from HART communication signals to be transmitted and received to and from the field equipment in the storage unit;
   a communication content monitoring unit configured to monitor contents of the communication through the communication conversion unit and instruct the waveform detection unit to start recording and stop the recording of data according to a signal acquisition timing specified by a user; and
   a waveform acquisition management unit configured to transmit the data accumulated in the storage unit to the diagnostic device when the recording of the data stops.

2. A diagnostic system comprising:
   the HART modem according to claim 1; and
   a diagnostic device,
   wherein the diagnostic device comprises:
      an acquisition timing instruction unit configured to transmit an instruction signal for instructing an acquisition timing to the HART modem upon reception of the acquisition timing of a HART communication signal specified by a user;
      a waveform generation unit configured to generate an image for displaying a signal waveform indicated by data upon reception of the data transmitted from the waveform acquisition management unit of the HART modem; and
      a display unit configured to display the image generated by the waveform generation unit.

3. The HART modem according to claim 1,
   further comprising a clock unit configured to count time, wherein
      the waveform detection unit records the data sampled from the HART communication signals, and a timestamp indicating time information acquired by the clock unit in the storage unit according to an instruction from the communication content monitoring unit, and
      the waveform acquisition management unit transmits the data accumulated in the storage unit and a timestamp attached to the data to the diagnostic device when the recording of the data and the timestamp stops.

4. A diagnostic system comprising:
   the HART modem according to claim 3; and
   a diagnostic device,
   wherein the diagnostic device comprises:
      an acquisition timing instruction unit configured to transmit an instruction signal for instructing an acquisition timing to the HART modem upon reception of the acquisition timing of a HART communication signal specified by a user;
      a waveform generation unit configured to generate an image for displaying a signal waveform indicated by data and a timestamp attached to the data upon reception of the data and the timestamp transmitted by the waveform acquisition management unit of the HART modem; and
      a display unit configured to display the image generated by the waveform generation unit.

5. The diagnostic system according to claim 2, wherein the acquisition timing specified by the user is one of
   a first timing in which a start of transmitting a HART communication command is a start event and an end of reception of a response to the HART communication command is an end event,
   a second timing in which a start of reception of the response is the start event and an end of transmission of a next command is the end event, and
   a third timing in which the end of reception of the response is the start event and a time point after an elapse of a certain period from the start event is the end event.

6. The diagnostic system according to claim 4, wherein the acquisition timing specified by the user is one of
   a first timing in which a start of transmitting a HART communication command is a start event and an end of reception of a response to the HART communication command is an end event,
   a second timing in which a start of reception of the response is the start event and an end of transmission of a next command is the end event, and
   a third timing in which the end of reception of the response is the start event and a time point after an elapse of a certain period from the start event is the end event.

* * * * *